(No Model.)
S. W. KILPATRICK.
HARROW AND CULTIVATOR.
No. 400,220. Patented Mar. 26, 1889.
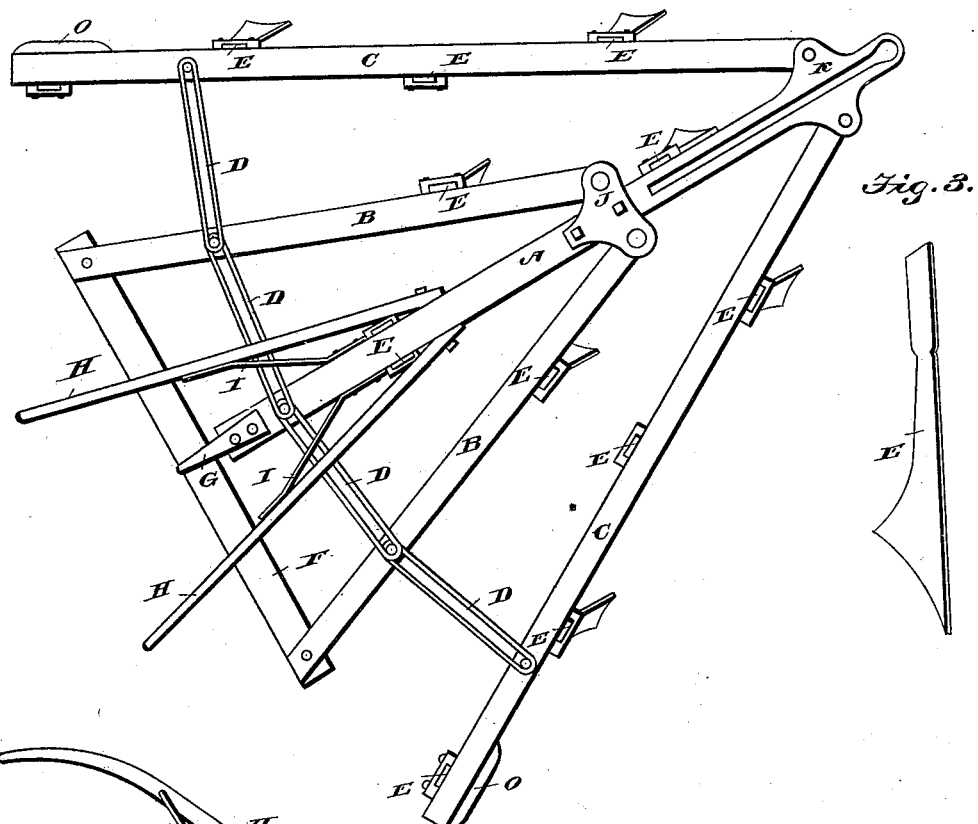
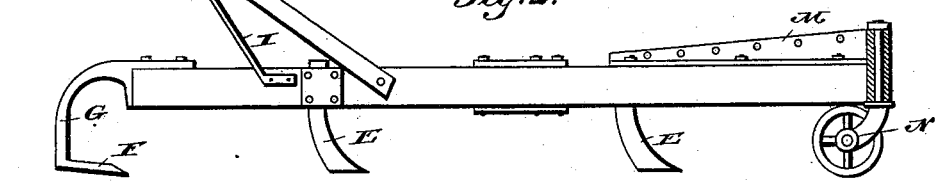
Witnesses:
Inventor:
S. W. Kilpatrick.
By James J. Sheehy
Asso. Attorney.

UNITED STATES PATENT OFFICE.

SAMUEL WILLIAM KILPATRICK, OF GILROY, CALIFORNIA.

HARROW AND CULTIVATOR.

SPECIFICATION forming part of Letters Patent No. 400,220, dated March 26, 1889.

Application filed July 24, 1888. Serial No. 280,945. (No model.)

*To all whom it may concern:*

Be it known that I, SAMUEL WILLIAM KILPATRICK, a citizen of the United States, residing at Gilroy, in the county of Santa Clara and State of California, have invented certain new and useful Improvements in Combined Harrows, Pulverizers, and Cultivators, of which the following is a description.

My invention relates to improvements in combined harrows, weed-cutters, and cultivators, of which the following is a specification.

Figure 1 is a plan view. Fig. 2 is a side elevation showing the center beam partly in section; Fig. 3, the harrow and cultivator teeth.

A represents the center beams; B, the intermediate beams; C, the outer beams; D, the connecting adjusting link-braces; E, harrow and cultivator teeth; F, the weed-cutter; G, the center brace for the weed-cutter; H, the handles; I, the handle brace-rods; J, the intermediate-beam-attaching plate; K, the outer-beam-attaching plate and draft-beam attached; L, the attaching-clamp for cultivator-teeth; M, the draft-attaching plate; N, the swivel or caster-wheel; O, the elastic or soft bumper for protecting trees and plants.

The following is the construction of my improved harrow, weed-cutter, and cultivator: I generally form the beams A, B, and C of such timber as is usually employed in the construction of that class of machinery. I hinge the beams B and C to the center beam by means of the plates J and K. I employ the link-braces D to connect and support the beams A, B, and C. I attach handles H, similar to plow-handles, and employ braces I to support the same. I employ bumpers O at the outer end of the beams C, to prevent the same from striking trees or plants, which might be injured and bruised by the timber. I form these bumpers O of india-rubber or any other suitable soft material, to guard against bruising the trees or plants. I form the teeth E of steel, and bend the same alternately to the right and left to place them upon the opposite side of the beams, and in such positions as to bring the front or cutting edges to cut like a plow and throw the dirt alternately to the right and left, thus leaving the land in the very best condition. I generally form the weed-cutter F of steel and keep it sharp for cutting weeds, as well as to throw the furrows together like plowshares. I design the clamps L to allow a slight adjustment of the position of the teeth E.

Having thus described my invention, what I claim, and desire to secure by Letters Patent, is—

The combined harrow, weed-cutter, and cultivator described, consisting, essentially, of the forward plate, K, the central beam, A, secured at its forward end thereto, the lateral beams C, having their forward ends pivoted to the said plate K, the intermediate short beams, B, pivotally secured to said beam A by plate J, the slotted links D, connecting the rear portions of the respective beams, and also connecting the said beams to the central beam, the weed-cutter F, secured at opposite ends to the intermediate beams, and the brace G, extending from said cutter to the rear end of the central beam, the handles and the teeth and cushions secured to the beams, substantially as specified.

SAMUEL WILLIAM KILPATRICK.

Witnesses:
S. WILLEY,
F. S. ROGERS.